United States Patent [19]
Thuillier, born Nachmias et al.

[11] 3,818,021

[45] June 18, 1974

[54] ALKOXY PHENOXY ACETAMIDES

[75] Inventors: Germaine Thuillier, born Nachmias, Paris; Francoise Geffroy, born Remy, Val De Marne, both of France

[73] Assignee: C. E. R. P. H. A. (Centre Europeen de Recherches Pharmacologiques), Archueil Val de Marne, France

[22] Filed: Dec. 24, 1969

[21] Appl. No.: 888,064

[30] Foreign Application Priority Data
Dec. 26, 1968  France .......................... 68.180720

[52] U.S. Cl....260/295 S, 260/247.2 A, 260/247.5 R, 260/293.77, 260/293.79, 260/326.43, 260/326.5 L, 260/326.85, 260/520, 260/544 M, 260/546, 260/559 A, 260/559 B, 260/574, 260/577, 424/266, 424/267, 424/248, 424/274, 424/324
[51] Int. Cl........................................... C07c 103/26
[58] Field of Search ... 260/559, 295, 247.2, 293.76, 260/326.43

[56] References Cited
UNITED STATES PATENTS

| | | | |
|---|---|---|---|
| 2,428,978 | 10/1947 | Martin et al. | 260/559 |
| 2,437,545 | 3/1948 | Martin et al. | 260/558 |
| 2,715,645 | 8/1955 | Casic | 260/559 |
| 2,948,954 | 8/1960 | Lituan et al. | 260/559 |

FOREIGN PATENTS OR APPLICATIONS

| | | | |
|---|---|---|---|
| 1,455,055 | 9/1966 | France | 260/559 |

*Primary Examiner*—Harry I. Moatz
*Attorney, Agent, or Firm*—Stevens, Davis, Miller and Mosher

[57] ABSTRACT

Alkoxy phenoxy acetamides in which the amido group carries a substituted phenyl substituant and a amino alkyl substituent, of which the amino group is dialkyl substituted or is an N-heterocyclic ring, are described together with methods for their production. The compounds are of pharmaceutical value for example as local anaesthetics, antispasmodics, anti-coagulants, antidepressive agents and diuretics.

4 Claims, No Drawings

ALKOXY PHENOXY ACETAMIDES

This invention relates to new compounds which are aryloxyacetamides and have valuable therapautic properties.

According to the present invention there are provided aryloxyacetamide compounds of the general formula I

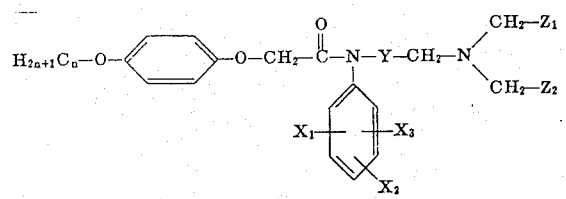

wherein
$X_1$ represents H, $CH_3$, $OCH_3$ or $OC_2H_5$,
$X_2$ represents $CH_3$, $OCH_3$, $OC_2H_5$ or Cl
$X_3$ represent H or $OCH_3$
Y represents $CH_2$, $CH(CH_3)$ or $CH_2-CH_2$
$Z_1$ and $Z_2$ each represent H or $CH_3$ or together represent $CH_2-CH_2$, $CH_2-CH_2-CH_2$, or $CH_2-O-CH_2$
and $n$ represents 1, 2, 3 or 4,
and the salts of the said compounds formed with pharmaceutically acceptable acids.

Compounds of particular value are those in which the radical $C_n H_{2n+1}$ is a normal butyl radical.

The invention further provides a process for the preparation of the said compounds which comprises condensing an alkoxy phenoxy acetic compound of the formula

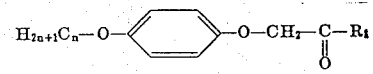

where $R_1$ is a halogen atom or a group of the formula OH, O-alkali metal, or

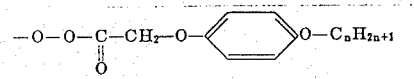

with a tertiary amine of the formula

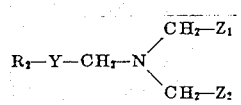

where $R_2$ is a group of the formula

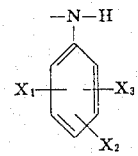

or condensing a compound of the formula

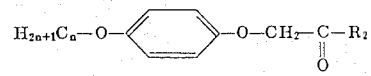

with a compound of the formula

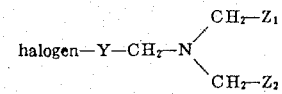

the symbols $n$, Y, $X_1$, $X_2$, $X_3$, $Z_1$ and $Z_2$ having the meanings assigned to them above.

In the latter process, the halogen is preferably chlorine and where $R_1$ is halogen the halogen is preferably chlorine.

The following examples will serve to illustrate the invention.

EXAMPLE 1

N-(2-diethylamino-N-(3-methoxyphenyl)-4-butoxyphenoxy acetamide, hydrochloride.

9.7 g. of 4-butoxy phenoxy acetyl chloride, in 50 ml of anhydrous benzene were added, with stirring, at a temperature of 5° to 10°C, to 8.9 g of N-(2-diethylamino ethyl)-N-(3-methoxy phenyl) amine in 50 ml of anhydrous benzene.

When the addition is completed the mixture is allowed to stand at ambient temperature, brought to reflux and refluxed for 2 hours. The hydrochloride separates on cooling and is washed in benzene and dried in an oven. It is recrystallised from 50 ml acetone and there is thus obtained 15.6 g (88 percent) of the required product. Melting point 125°–126°C.

EXAMPLE 2

N-(2,5-diethoxy phenyl)-N-(2-pyrrolidino-ethyl)-4-butoxy phenoxy acetamide, hydrochloride.

1.8 g of N-(2,5-diethoxy phenyl)N-(2-pyrrolidino-ethyl) amine in solution in 12.5 ml of dry benzene, 1.6 g of 4-butoxy phenoxy acetyl chloride in solution in 12.5 ml of dry benzene were mixed, at 15°C. The mixture is heated for 2 hours under reflux. The crystalline product is separated on cooling and recrystallised from a mixture of acetone and isopropanol. There is thus obtained 2 g (59%) of the hydrochloride, melting point 1-47°–156°C.

EXAMPLE 3

N-(2-methoxy phenyl)-N-(2-pyrrolidino-ethyl)-4-methoxy-phenoxy acetamide, hydrochloride A benzene solution of 3.3 g of N-(2-methoxy phenyl)-N-(2-pyrrolldono-ethyl)amine is added to a benzene solution of 4-methoxy-phenoxy acetyl chloride at 10°C, the mixture refluxed for 4 hours, the crystalline product recovered and recrystallised from methyl ethyl ketone. There is thus obtained 2.7 g (43%) of the hydrochloride, melting point 156°C.

EXAMPLE 4

N-(2,5-diethoxy phenyl)-N-(2-diethylamino ethyl)-4-butoxy phenoxy acetamide.

*a.* 420 g of 2,5-diethoxy aniline are dissolved in 4 litres of dichloroethane and 230 g of triethylamine is added. The mixture is heated, while stirring, with 845 g of 4-butoxy phenoxy acetyl chloride.

The temperature increases towards 40°C. The mixture is then heated for 2 hours at 80°C. After cooling the product is washed with normal hydrochloric acid, then with water, then with normal sodium carbonate and finally with water.

The organic phase is dried over sodium sulphate, filtered, the dichloroethane is evaporated off and the residue is crystallised from ethyl alcohol (95 percent). The product is dried in the oven and there is thus obtained about 800 g (yield 90 percent) of the N-(2,5-diethoxy-phenyl)-4-butoxy phenoxy acetamide. Melting point 101°C.

*b.* A vessel provided with a mechanical agitator, a thermometer and a refrigerant, is charged with 49.2 g of sodamide (90 percent) in suspension in 300 ml of anhydrous toluene, and a solution of 465 g of amide obtained as above in 2 litres of anhydrous toluene. The solution is poured in, little by little during 1½ hours with slight warming. The mixture is maintained for 1 hour at 80°C during which ammonia is evolved. It is cooled to 45°C, there is added, in a single quantity, 170 of 2-diethyl-amino-1-chloroethane and the temperature is raised slowly to 100°C and is maintained there for 10 hours.

The mixture is cooled, the organic phase washed with water and dried over sodium sulphate. The toluene is evaporated and the residue taken up in 2 litres of normal acetic acid, with cooling.

It is allowed to crystallise in the cold, filtered to remove the insoluble portion and the base precipitated from the filtrate by the addition of 10N sodium carbonate; this is extracted with dichloroethane and the organic phase dried over sodium sulphate.

After evaporation of the solvent an oil is distilled, b.p.$_{0.1}$225°–230°C, weight 340 g., yield 58 percent.

The hydrochloride prepared by the action of gaseous hydrogen chloride on this oil in ethylether melts at 140°C.

EXAMPLE 5

By proceeding as in Example 4 and passing through the intermediacy of N-(3-methoxyphenyl)-4-butoxy-phenoxy acetamide (m.p. 60°–62°C), there is obtained N-(3-methoxy-phenyl)-N-(2-diethylaminoethyl)-4-butoxy-phenoxy acetamide and its hydrochloride (melting point 125°–126°C).

EXAMPLE 6

N-(3-ethoxy phenyl)-N-(2-diethylamino ethyl)-4-butoxy-phenoxy acetamide

There is dissolved, in an Erlenmeyer flask, 10.9 g of 4-butoxy phenoxy acetic anhydride (melting point 64°–65°C) in 25 ml of anhydrous pyridine and there is added, in two portions, 5.9 g of N-(2-diethylamino ethyl)-3-ethoxy aniline in solution in 5 ml of anhydrous pyridine. A slight warming takes place. The mixture is stirred for 40 minutes and allowed to stand for 1½ hours. The pyridine is evaporated off under reduced pressure. The residual oil is treated with 10 percent aqueous hydrochloric acid until acid to congo red paper. The crystalline 4-butoxy phenoxy acetic acid formed is filtered off (or extracted with diethyl ether) and the base is precipitated from the filtrate (or the aqueous phase) by addition of 30 percent sodium carbonate.

The product is extracted with diethyl ether, the etherial solution is dried over sodium sulphate, the solvent is evaporated and there is obtained 7.15 g (yield 65 percent) of an oil which is converted to the hydrochloride by treatment with an ether solution of hydrochloric acid, melting point 98° – 100°C.

EXAMPLE 7

N-(2-methoxy-phenyl)-N-(2-pyrrolidino ethyl)-4-butoxy phenoxy acetamide, hydrochloride 9.9 g of N-(2-methoxyphenyl)-N-(2-pyrrolidinoethyl) amine is dissolved in 25 ml of methyl ethyl ketone and, with stirring, at a temperature of 10°C, there is added a solution of 12.1 g of 4-butoxy phenoxy acetyl chloride in 25 ml of methyl ethyl ketone, which is added drop by drop.

When the addition is completed, the hydrochloride of N-(2-methoxy phenyl)-N-(2-pyrrolidino ethyl)-4-butoxy phenoxy acetamide crystallises out. This is recovered and washed with a little methyl ethyl ketone. There is obtained 11.5 g (yield 56 percent) of the hydrochloride melting at 126°–127°C.

EXAMPLE 8

N-(2,6-dimethylphenyl)-N-(2-pyrrolidino ethyl)-4-butoxy phenoxy acetamide

*a.* 12.8 g of 2,6-dimethyl aniline is dissolved in 100 ml of dichloroethane and 10.1 g of triethylamine is added. To this solution is added, drop by drop, while stirring, 24.25 g of 4-butoxy phenoxy acetyl chloride. The temperature of the mixture rises to 45°C. It is refluxed for 2 hours. It is then cooled, washed with normal hydrochloric acid, then water, then normal sodium carbonate and finally with water. The product is dried over magnesium sulphate. The solvent is evaporated under reduced pressure and the crystals obtained are recrystallised from 95 percent ethyl alcohol.

There is obtained 26.9 g (81 percent) of N-(2,6-dimethyl phenyl)-4-butoxy-phenoxy acetamide.

*b.* To a suspension of 3.48 g of sodamide (90 percent) in 45 ml of anhydrous toluene there is added, drop by drop, with stirring, 26.3 g of N-(2,6-dimethyl phenyl)-4-butoxy phenoxy acetamide in solution in 200 ml of anhydrous toluene. During the addition the reaction mixture is slightly warmed on an oil bath at 60°C. The duration of the addition is 1½ hours. The mixture is held at 80°C for 1 hour. After having cooled to 45°C there is added, in one quantity, 11.2 g of 2-pyrrolidino-chlorethane and the temperature of the oil bath is raised slowly to 100°C and maintained thus for 10 hours. The product is cooled, some impurities separated by filtration, and washed with water. The organic solution is dried over $Na_2SO_4$. The toluene is evaporated under reduced pressure and the oily residue is taken up in 170 ml of normal acetic acid while slightly warming the mixture. The product is cooled and filtered to remove the insoluble portion. The base is precipitated from the filtrate by addition of an aqueous 40 percent solution of sodium carbonate and the decanted oil is extracted with dichloroethane. It is dried over sodium sulphate.

After evaporation of the solvent under reduced pressure there is obtained 24.8 g (72.9 percent) of an oil which is transformed into the hydrochloride by dissolving in diethyl ether and the passage of dry hydrochloric acid gas. The while solid thus obtained is recrystallised from methyl ethyl ketone. Melting point 128°C.

The structural formulae of the different compounds prepared, those of their salts and the melting points of the salts are collected in the following Table where each compound is assigned a code number (5, 25, 1, 24, 13, 27 and 8 for the Examples 1, 2, 3, 4, 5, 6 and 7 respectively).

TABLE

| No. | Structural formula | Empirical formula of the hydrochloride | Melting point (° C.) of the salt (hydrochloride unless otherwise specified) |
|---|---|---|---|
| 1 | $H_3CO-\text{C}_6H_4-O-CH_2-CO-N(CH_2-CH_2-N\text{pyrrolidine})(\text{C}_6H_4-OCH_3)$ | $C_{22}H_{29}ClN_2O_4$ | 156°. |
| 2 | $H_3CO-\text{C}_6H_4-O-CH_2-CO-N(CH_2-CH_2-N(C_2H_5)_2)(\text{C}_6H_4-OCH_3)$ | $C_{22}H_{31}ClN_2O_4$ | 154–155°. |
| 3 | $H_5C_2O-\text{C}_6H_4-O-CH_2-CO-N(CH_2-CH_2-N(C_2H_5)_2)(\text{C}_6H_4-OCH_3)$ | Picrate $C_{29}H_{35}H_5O_{11}$ | Picrate 116°. |
| 4 | $i\text{-}H_7C_3O-\text{C}_6H_4-O-CH_2-CO-N(CH_2-CH_2-N(C_2H_5)_2)(\text{C}_6H_4-OCH_3)$ | $C_{24}H_{35}ClN_2O_4$ | 118–119°. |
| 5 | $n\text{-}H_9C_4O-\text{C}_6H_4-O-CH_2-CO-N(CH_2-CH_2-N(C_2H_5)_2)(\text{C}_6H_4-OCH_3)$ | $C_{25}H_{37}ClN_2O_4$ | 125–126°. |
| 6 | $H_9C_4O-\text{C}_6H_4-O-CH_2-CO-N(CH_2-CH_2-N(CH_3)_2)(\text{C}_6H_4-OCH_3)$ | $C_{23}H_{33}ClN_2O_4$ | 127°. |
| 7 | $H_9C_4O-\text{C}_6H_4-O-CH_2-CO-N(CH_2-CH_2-N(C_2H_5)_2)(\text{C}_6H_4-OCH_3)$ | $C_{25}H_{37}ClN_2O_4$ | 115°. |
| 8 | $H_9C_4O-\text{C}_6H_4-O-CH_2-CO-N(CH_2-CH_2-N\text{pyrrolidine})(\text{C}_6H_4-OCH_3)$ | $C_{25}H_{53}ClN_2O_4$ | 126–127°. |
| 9 | $H_9C_4O-\text{C}_6H_4-O-CH_2-CO-N(CH_2-CH_2-N(CH_3)_2)(\text{C}_6H_4-OCH_3)$ | $C_{23}H_{33}ClN_2O_4, H_2O$ | 92–94°. |

Table—Continued

| No. | Structural formula | Empirical formula of the hydrochloride | Melting point (° C.) of the salt (hydrochloride unless otherwise specified) |
|---|---|---|---|
| 10 | H$_9$C$_4$O—C$_6$H$_4$—O—CH$_2$—CO—N(C$_6$H$_4$—OCH$_3$)—CH$_2$—CH$_2$—N(pyrrolidine) | C$_{25}$H$_{35}$ClN$_2$O$_4$ | 140°. |
| 11 | H$_9$C$_4$O—C$_6$H$_4$—O—CH$_2$—CO—N(C$_6$H$_4$—OCH$_3$)—CH$_2$—CH$_2$—N(piperidine) | C$_{26}$H$_{37}$ClN$_2$O$_4$ | 119–120°. |
| 12 | H$_9$C$_4$O—C$_6$H$_4$—O—CH$_2$—CO—N(C$_6$H$_4$—OCH$_3$)—CH$_2$—CH$_2$—N(morpholine) | C$_{25}$H$_{35}$ClN$_2$O$_5$ | 118°. |
| 13 | H$_9$C$_4$O—C$_6$H$_4$—O—CH$_2$—CO—N(C$_6$H$_4$—OCH$_3$)—CH$_2$—CH$_2$—CH$_2$—N(C$_2$H$_5$)$_2$ | C$_{26}$H$_{39}$ClN$_2$O$_4$ | 125–126°. |
| 14 | H$_9$C$_4$O—C$_6$H$_4$—O—CH$_2$—CO—N(C$_6$H$_4$—OCH$_3$)—CH(CH$_3$)—CH$_2$—N(pyrrolidine) | C$_{26}$H$_{37}$ClN$_2$O$_4$ | 120°. |
| 15 | H$_9$C$_4$O—C$_6$H$_4$—O—CH$_2$—CO—N(C$_6$H$_4$—OCH$_3$)—CH(CH$_3$)—CH$_2$—N(piperidine) | Base C$_{27}$H$_{38}$N$_2$O$_4$ | Base 72–74°. |
| 16 | H$_9$C$_4$O—C$_6$H$_4$—O—CH$_2$—CO—N(C$_6$H$_4$—OCH$_3$)—CH$_2$—CH$_2$—N(CH$_3$)$_2$ | Picrate C$_{29}$H$_{35}$N$_5$O$_{11}$ | Picrate 96–97°. |
| 17 | H$_9$C$_4$O—C$_6$H$_4$—O—CH$_2$—CO—N(C$_6$H$_4$—OCH$_3$)—CH$_2$—CH$_2$—N(C$_2$H$_5$)$_2$ | C$_{25}$H$_{37}$ClN$_2$O$_4$ | 98–99°. |
| 18 | H$_9$C$_4$O—C$_6$H$_4$—O—CH$_2$—CO—N(C$_6$H$_4$—OCH$_3$)—CH$_2$—CH$_2$—CH$_2$—N(C$_2$H$_5$)$_2$ | Oily base, no crystalline salt | |

Table—Continued

| No. | Structural formula | Empirical formula of the hydrochloride | Melting point (° C.) of the salt (hydrochloride unless otherwise specified) |
|---|---|---|---|
| 19 | $H_9C_4O-\langle\text{C}_6H_4\rangle-OCH_2-CO-N(-CH(CH_3)-CH_2-N(C_2H_5)_2)-\langle\text{C}_6H_4\text{-}OCH_3\rangle$ | Picrate $C_{32}H_{41}N_5O_{11}$ | 126°. |
| 20 | $H_9C_4O-\langle\text{C}_6H_4\rangle-O-CH_2-CO-N(-CH(CH_3)-CH_2-\text{piperidino})-\langle\text{C}_6H_4\text{-}OCH_3\rangle$ | Tartrate $C_{31}H_{44}N_2O_{10}$ | 98–100°. |
| 21 | $H_9C_4O-\langle\text{C}_6H_4\rangle-O-CH_2-CO-N(-CH_2-CH_2-N(C_2H_5)_2)-\langle\text{C}_6H_3(OCH_3)_2\rangle$ (2,4-diOCH$_3$) | $C_{26}H_{39}ClN_2O_5$ | 120°. |
| 22 | $H_9C_4O-\langle\text{C}_6H_4\rangle-O-CH_2-CO-N(-CH_2-CH_2-N(C_2H_5)_2)-\langle\text{C}_6H_3(OCH_3)_2\rangle$ (3,4-diOCH$_3$) | $C_{26}H_{39}ClN_2O_5$ | 128–130°. |
| 23 | $H_9C_4O-\langle\text{C}_6H_4\rangle-O-CH_2-CO-N(-CH_2-CH_2-N(C_2H_5)_2)-\langle\text{C}_6H_3(OCH_3)_2\rangle$ (2,5-diOCH$_3$) | $C_{26}H_{39}ClN_2O_5$ | 120°. |
| 24 | $H_9C_4O-\langle\text{C}_6H_4\rangle-O-CH_2-CO-N(-CH_2-CH_2-N(C_2H_5)_2)-\langle\text{C}_6H_3(OC_2H_5)_2\rangle$ | $C_{28}H_{43}ClN_2O_5$ | 140°. |
| 25 | $H_9C_4O-\langle\text{C}_6H_4\rangle-O-CH_2-CO-N(-CH_2-CH_2-\text{pyrrolidino})-\langle\text{C}_6H_3(OC_2H_5)_2\rangle$ | $C_{28}H_{41}ClN_2O_5$ | 147–150° |
| 26 | $H_9C_4O-\langle\text{C}_6H_4\rangle-O-CH_2-CO-N(-CH_2-CH_2-N(C_2H_5)_2)-\langle\text{C}_6H_2(OCH_3)_3\rangle$ | $C_{27}H_{41}ClN_2O_6$ | 145–146°. |
| 27 | $H_9C_4O-\langle\text{C}_6H_4\rangle-O-CH_2-CO-N(-CH_2-CH_2-N(C_2H_5)_2)-\langle\text{C}_6H_4\text{-}OC_2H_5\rangle$ | $C_{26}H_{39}ClN_2O_4$ | 98–100°. |

Table—Continued

| No. | Structural formula | Empirical formula of the hydrochloride | Melting point (° C.) of the salt (hydrochloride unless otherwise specified) |
|---|---|---|---|
| 28 | $H_9C_4O-\langle\bigcirc\rangle-O-CH_2-CO-N(-CH_2-CH_2-N(CH_3)_2)(C_6H_4-OC_2H_5)$ | $C_{24}H_{35}ClN_2O_4$ | Hydrochloride 128°. |
| 29 | $H_9C_4O-\langle\bigcirc\rangle-O-CH_2-CO-N(-CH_2-CH_2-N(CH_3)_2)(2,5-(C_2H_5O)_2C_6H_3)$ | $C_{26}H_{39}ClN_2O_5$ | Hydrochloride 170°. |
| 30 | $H_9C_4O-\langle\bigcirc\rangle-O-CH_2-CO-N(-CH_2-CH_2-pyrrolidinyl)(2-ClC_6H_4)$ | $C_{24}H_{31}ClN_2O_3$ (base) | Hydrochloride-hydroscopic. |
| 31 | $H_9C_4O-\langle\bigcirc\rangle-O-CH_2-CO-N(-CH_2-CH_2-N(C_2H_5)_2)(2-ClC_6H_4)$ | $C_{24}H_{33}ClN_2O_2$ | Hydrochloride hygroscopic. |
| 32 | $H_9C_4O-\langle\bigcirc\rangle-O-CH_2-CO-N(-CH_2-CH_2-pyrrolidinyl)(2,6-(CH_3)_2C_6H_3)$ | $C_{26}H_{37}ClN_2O_3$ | 128°. |
| 33 | $H_9C_4O-\langle\bigcirc\rangle-O-CH_2-CO-N(-CH_2-CH_2-N(CH_3)_2)(2,6-(CH_3)_2C_6H_3)$ | $C_{24}H_{35}ClN_2O_3$ | 196°. |
| 34 | $H_9C_4O-\langle\bigcirc\rangle-O-CH_2-CO-N(-CH_2-CH_2-N(C_2H_5)_2)(2,6-(CH_3)_2C_6H_3)$ | $C_{26}H_{38}N_2O_4$ (base) | Oily hydrochloride. |
| 35 | $H_9C_4O-\langle\bigcirc\rangle-O-CH_2-CO-N(-CH_2-CH_2-piperidinyl)(2,6-(CH_3)_2C_6H_3)$ | $C_{27}H_{39}ClN_2O_3$ | 148°. |
| 36 | $H_9C_4O-\langle\bigcirc\rangle-O-CH_2-CO-N(-CH(CH_3)-CH_2-piperidinyl)(2,6-(CH_3)_2C_6H_3)$ | $C_{28}H_{41}ClN_2O_3$ | 120°. |

The compounds of this invention have valuable uses in medicine. The compounds have been subjected to the following tests:

A. Acute Toxicity

The study was made using mice.

To avoid risk of error due to variation in animals the animals of a common type were arranged before experimentation in groups homogeneous both as to sex and weight.

The products, soluble in water, were administered intravenously and digestively. Their volumes were calculated as a function of the animal weight at the rate of 0.5 ml per 20 g. of body weight. After administration of the product the animals were observed for 48 hours and the lethal dose $Dl_{50}$ was calculated according to the method of Litchfield and Wilcoxon.

B. Pharmacology a. Local anaesthetic activity on the cornea of the rabbit

The local anaesthetic activity of the products was studied according to the method of Regnier on the cornea of the rabbit. The substance, in solution at a given concentration, is placed in contact with the cornea for 1 minute.

To do this the endopalpebral cavity is filled with solution. At the end of the minute the cavity is emptied and the eye softly dried. The test is then commenced by touching the cornea lightly and rapidly with a rabbit moustache hair. The experiment is repeated each 5 minutes at the rate of 100 stimulations at maximum.

The duration of the local anaesthesia is determined by the oculo-palpebral reflex.

b. Antispasmodic activity

1. Isolated duodenum of the rat

The test products were dissolved in distilled water. After removal, the duodenum is plunged into a solution of Tyrode, aerated and maintained in a thermostat at 37°C.

Barium chloride was used as the contraction agent, the required concentration being $5 \times 10^{-3}$ in the bath.

The products were added to the Tyrode solution 30 seconds before the contraction agent. The reduction in contraction is a function of the antispasmodic activity of the product.

2. Isolated rabbit heart

The products are dissolved in water and injected at increasing doses in the coronary system of the isolated rabbit heart maintained alive by the method of Langendorf. The experiments thus effected on an isolated heart, perfused by an oxygenated liquid maintained at a temperature of 38° and under a pressure of 0.40 m of water, make it possible to study, together, the effect of the products on the coronary vasomotricity and on the rhythmic contraction of the myocardiac fibres.

3. Isolated rabbit head

After section of the aortic trunk the head of the animal is separated from the body; the carotids are catheterised and connected to a perfusion apparatus identical to that used in the case of the isolated heart. The perfusion pressure is about 40 cm water, the temperature 37°C and the liquid employed is constituted according to the formula of Green and Page. The test products are injected in increasing doses at the level of the carotids. In some experiments the external carotids are connected and the circulation effected almost exclusively at the level of the brain. A flow meter is used to register the flow at the level of the jugular veins.

c. Anticoagulant activity

1. In vitro

Rabbit blood is recovered by cardiac puncture and added to a given quantity of the test product contained in a tube of 10 ml capacity.

The coagulation time is compared to that of the same blood not so treated. In more sophisticated tests the different variations in the coagulation constants were determined (time according to Quick and time according to Howell).

2. In vivo

The test products were administered by the buccal route to non-anaesthetised dogs. The blood is then withdrawn at the level of the saphenous vein. The variations of the different coagulation times were thus determined.

d. Antidepressive activity

1. Tetrabenazine in the mouse

The test products were administered to the mice by the buccal route 30 minutes to 10 hours after the injection of the tetrabenazine (3 mg/kg i.p.). The mice were then subjected to actograph test. The depressive effect of the products was then evaluated as a function of the reduction in sedation provoked by the tetrabenazine in the treated mice, one group of mice serving as a control.

2. Reserpine in the rat and rabbit

In the rat: Antagonism to the potentialisation of the narcotic effect of ethanol. The test products were administered subcutaneously and simultaneously, to groups of 10 rats to which had been administered 4 mg/kg (i.p.) of reserpine. An hour later alcohol (3 g/kg of a 50 percent solution) was injected intraperitoneally. The sleeping time of the groups of rats receiving "reserpine — test product — alcohol" was compared with that of the groups of rats receiving "reserpine-alcohol." The reduction in sleeping time of the treated animals is a function of the anti-reserpine effect of the test products, and accordingly of the anti-depressive effect.

In the Rabbit

Rabbits of average weight 2.5 kg were injected intravenously with 2.5 mg/kg of reserpine. An hour later the test products as 0.5 percent solutions in distilled water, were perfused at the level of the saphenous vein, at a constant rate of 0.5 ml per minute. In the case where the test product has anti-reserpinic activity there results an increase in the palpebral ptosis provoked by the reserpine injection. The time necessary to obtain this increase determines the dose at which the product has anti-depressive activity.

e. Diuretic activity in the rat

The rats, starved before the test, received the test product by the gastric route, the products being administered as 0.9 percent solution in physiological water at a volume of 5 ml per 100 g of animal weight. The rats were then grouped in threes in cages permitting the calculation of the hourly diuresis. The volume or urine received in the graduated collecting vessels enabled a comparison to be made of the diuresis between treated animals and control animals.

The results of the foregoing tests are collected together in the following Table II where the compounds are numbered as in Table I.

TABLE II

| No. | Acute Toxicity DL₅₀ I.V. | Acute Toxicity DL₅₀ P.O. | Local anaesthetic Activity, cornea of rabbit (procaine=1) | Diuretic Activity (Theoph.=1) | Antispasmodic activity Duodenum papav.=+ | Antispasmodic activity Heart isolated | Anticoagulant activity | Antidepressive activity | Cerebral vasodilatatric activity |
|---|---|---|---|---|---|---|---|---|---|
| \multicolumn{10}{c}{4-alkoxy-phenoxy acetic acid derivatives} |
| 1 | 30 | 400 | 0 | 3 | 0 | +++ | − | + | + |
| 2 | 60 | 1 g | 1 | 0.5 | 0 | + | − | − | + |
| 3 | 45 | 800 | 3 | 1 | + | . | − | − | + |
| 4 | 50 | 850 | 10 | 0 | 0 | + | − | − | + |
| \multicolumn{10}{c}{4-butoxy-phenoxy acetic acid derivatives} |
| 5 | 45 | 800 | 30 | 0.5 | +++++ | ++++ | +++ | − | + |
| 6 | 47 | 1 g | 30 | 1 | 0 | 0 | − | − | ++ |
| 7 | 22 | 350 | 50 | 2 | +++ | 0 | +++ | − | ++ |
| 8 | 25 | 300 | 100 | 1 | ++ | + | − | +++ | ++ |
| 9 | 70 | 1 g | 20 | 0.5 | ++++ | +++ | +++ | − | + |
| 10 | 60 | 1 g | 50 | 0 | + | +++ | − | − | + |
| 11 | 45 | 1 g | 20 | 0 | + | +++ | − | − | + |
| 12 | 90 | 1 g | 10 | 0.5 | + | + | − | − | + |
| 13 | 30 | 500 | 10 | 0.5 | +++ | +++ | − | − | + |
| 14 | 27 | 650 | 50 | 0 | 0 | ± | − | − | ± |
| 15 | 12 | 600 | 20 | 0 | + | ++ | − | − | ± |
| 16 | 85 | 600 | 10 | 0 | +++ | +++ | + | − | + |
| 17 | 60 | 1 g | 2 | 0 | + | ± | − | − | ± |
| 18 | 40 | 500 | 20 | 1 | ++++ | +++ | +++ | − | + |
| 19 | 45 | 600 | 20 | 0.5 | + | + | − | − | − |
| 20 | 40 | 500 | 50 | 1 | + | ± | − | − | − |
| 21 | 40 | 400 | 20 | 0.5 | + | ± | − | − | − |
| 22 | 47 | 950 | 20 | 0.5 | +++++ | + | +++ | − | − |
| 23 | 25 | 400 | 20 | 1 | ++ | +++ | − | − | − |
| 24 | 17 | 750 | 50–100 | 0 | ++++ | +++++ | − | +++ | +++ |
| 25 | 20 | 450 | 10 | 0 | ++++ | +++++ | − | − | +++ |
| 26 | 30 | 600 | 10 | 0 | +++++ | + | − | − | ± |
| 27 | 35 | 800 | 20 | 0 | ++++ | +++ | − | ± | ± |
| 28 | 65 | 780 | 20 | 1 | 2 | + | − | ± | ± |
| 29 | 35 | 500 | 20 | 1 | 1 | + | − | ± | ± |
| 30 | 25 | 500 | 10–20 | − | 3 | + | − | ± | ± |
| 31 | 28 | 625 | 500 | 2 | 3 | +++ | = | ± | + |

Referring to the foregoing Table II:

A. Acute Toxicity

The results given in Table II are expressed in mg/kg of mouse.

B. Pharmaologic a. Local anaesthetic activity

The local anaesthetic activity of procaine has been taken as the standard. The figures given in the Table indicate the power of the different products relative to procaine, which at a concentration of 1 percent promotes a local anaesthesia of the cornea of 15 minutes duration. In these conditions the exceptional efficacy of certain of the compounds (Nos. 5, 7, 8, 10, 14, 20 and 24) is demonstrated.

Since their acute toxicity is lower than that of lignocaine and comparable to that of procaine, the therapeutic value of the compounds is apparent.

b. Antispasmodic activity

1. Isolated duodenum of the rat

The antispasmodic activity of papaverine in reference to the contraction induced by barium chloride is signified by the symbol +. The following table affords means to evaluate the antispasmodic activity quantitatively:

| Final concentration of the product added to the bath provoking an inhibition of 50% of the contraction | Corresponding Sign | |
|---|---|---|
| 1 µg/ml | +++++ | |
| 2 µg/ml | ++++ | |
| 3 µg/ml | +++ | |
| 4 µg/ml | ++ | |
| 5 µg/ml | + | (papaverine) |

Some of the products show activities five times more active than papaverine (NOs. 5, 22 and 26). Most of them are twice or three times more effective, for a comparable DL₅₀ value.

2. Isolated rabbit heart

The coronary dilatatric activity of papaverine being taken as the unit base, the table shows a number of the products as being of interest (Nos. 5, 7, 9, 10, 11, 13, 16, 18, 23, 24, 25 and 27).

3. Cerebral vasomotricity

For some of the compounds (Nos. 6, 7, 8 and 24) the injection of doses of the order of micrograms provokes a vasodilatation more intense and more prolonged than equivalent doses of acetyl choline hydrochloride.

c. Anticoagulant activity

1. In vitro

Successive doses of the product added to 10 ml of fresh rabbit blood show a powerful anticoagulant activity in certain compounds of the class. For convenience, the anticoagulant activity has been evaluated by + and − signs corresponding respectively to an irreversible activity and no activity. The most active compounds, at doses of 0.1 mg to 50 mg in 10 ml of blood, are Nos. 5, 7, 9, 16 18 and 22.

In addition to the anticoagulant activity, an antiplaquetary action is made, for doses in the neighbourhood of 100 µg/ml of blood, for certain of the compounds.

2. In vivo.

Compounds 5, 9 and 18 have been subjected to a more profound study in the dog. Administered by the buccal route at doses ranging from 10 to 50 mg/kg they provoke a significant increase in the time according to Quick, in tolerance to heparine, and on the Howell test. No haemolysis has been noted at these dosages. These tests demonstrate above all the activity of these substances by the buccal route and emphasise their therapeutic interest.

d. Antidepressive activity

1. Antagonism to tetrabenazine in the mouse

Some derivatives are strongly active (Nos. 8 and 24) administered at doses of 20 mg/kg they inhibit 50% of the sedative action of tetrabenazine.

2. Antagonism to the potentalisation of alcohol by reserpine in the rat and the rabbit In the rat: these same derivatives, injected subcutaneously in the rat inhibit the potentalisation of alcoholic sleep by reserpine. They show themselves, in this test, more active than the important antidepressive imipramine.

In the rabbit: the perfusion of a 0.5 percent solution of compound No. 8 raises the reserpinic ptosis to a dose about 1 mg/kg. Imipramine does it only at a dose of about 10 mg/kg.

e. Diuretic activity in the rat

The basic unit corresponds to the diuretic action of theophylline in a dose of 50 mg/kg administered orally. Numerous compounds are active: some exhibit a considerable diuretic power (Nos. 1 and 7).

In summary, therefore, the local anaesthetic activity, by contact, infiltration or conduction is stronger than that of procaine and lignocaine at concentrations of 0.01 to 2 percent: the compounds exhibit extremely valuable antispasmodic and anticoagulant effects, and the compounds exhibit extremely valuable antidepressive effects and diuretic effects.

The compounds of the present invention may be employed for therapeutic or other medical use per se or in the form of a pharmaceutical composition comprising a said compound together with a solid, semi-solid or liquid pharmaceutically acceptable diluent. Thus, compounds intended to be used for local anaesthesia may be provided in the form of isotonic solutions at concentrations varying from 0.01 to 2% with or without pharmacologically acceptable additives, or a injectable solutions, or ointments. Suitable compounds are Nos. 5, 7, 8, 10, 14, 20 and 24.

The compounds to be used for their antispasmodic and anticoagulant activity may be presented as tablets, capsules, dragees or suppositories, containing 1 mg to 1g. of the active compound, optionally with other pharmacologically acceptable additives, or may be provided as injectable or potable solutions. Suitable compounds are Nos. 5 to 11, 13, 16, 18 and 22 to 27.

Compounds to be used for their antidepressive activity may conveniently be presented in any of the forms indicated above containing dosage units of 1 to 500 mg of the active compound. Suitable compounds are Nos. 8 and 25.

Compounds to be used for their diuretic activity may be similarly presented, at dosage units of 1 to 1000 mg in the case of solid compositions and 1 to 500 mg in the case of injectable or potable solutions.

Whilst all the compounds of the class indicated have utility as described, certain of them appear to be of particular value. These are:

Compound No. 1

N-(2-methoxy phenyl)-N-(2-pyrrolidino ethyl)-4-methoxy phenoxy acetamide and its hydrochloride, which is particularly useful as a local anaesthetic in solution, e.g. at strengths of 0.05 to 0.5 percent. Other compounds of special value as local anaesthetics are numbers 8 and 32–36.

Compound No. 24

N-(2,5-diethoxy-phenyl)-N-(2-diethyl aminoethyl)-4-butoxy phenoxy acetamide and its hydrochloride which may be used as a spasmolytic. For this purpose it may be used in the form of a drinkable aqueous solution in a daily dosage of 300 mg. in the form of tablets or capsules in the same dosage, or in the form of injectable solution in ampoules the daily dosage being, for example, four such ampoules each containing 25 mg. of the compound.

Other compounds of special value as spasmolytics are compounds numbers 9, 17, 22 and 25–27.

We claim as our invention:

1. An alkoxy-phenoxy acetamide selected from the group consisting of the monohydrochloride of N-(3-methoxy phenyl) N-(2-diethylamino ethyl) 4-methoxy-phenoxy acetamide, the monohydrochloride of N-(2-methoxy phenyl) N-(2-diethylamino ethyl) 4-butoxy phenoxy acetamide, the monohydrochloride of N-(2-methoxy phenyl) N-(2-pyrrolidino ethyl) 4-butoxy phenoxy acetamide, the monohydrochloride of N-(3-methoxy phenyl) N-(2-dimethylamino ethyl) 4-butoxy phenoxy acetamide, the monohydrochloride of N-(3-methoxy phenyl) N-(2-pyrrolidino ethyl) 4-butoxy phenoxy acetamide, the monohydrochloride of N-(3-methoxy phenyl) N-(3-diethylamino propyl) 4-butoxy phenoxy acetamide, the monohydrochloride of N-(2,5-dimethoxy phenyl) N-(2-diethylamino ethyl) 4-butoxy phenoxy acetamide, the monohydrochloride of N-(2,5-diethoxy phenyl) N-(2-diethylamino ethyl) 4-butoxy phenoxy acetamide, the monohydrochloride of N-(2,5-diethoxy phenyl) N-(2-pyrrolidino ethyl) N-butoxy phenoxy acetamide, the monohydrochloride of N-(3-ethoxy phenyl) N-(2-diethylamino ethyl) 4-butoxy phenoxy acetamide, N-(2,5-diethoxy phenyl) N-(2-diethylamino ethyl) 4-butoxy phenoxy acetamide, N-(3-ethoxy phenyl) N-(2-diethylamino ethyl) 4-butoxy phenoxy acetamide, the picrate of N-(4-methoxy phenyl) N-(2-dimethylamino ethyl) 4-butoxy phenoxy acetamide, and the monohydrochloride of N-(4-methoxy phenyl) N-(3-diethylamino propyl) 4-butoxy phenoxy acetamide.

2. The compound N-(2,5-diethoxy phenyl)N-(2-diethylaminoethyl) 4-butoxy phenoxy acetamide.

3. The hydrochloride of the compound of claim 2.

4. The alkoxy phenoxy acetamide of claim 1 which is the monohydrochloride of N-(3-methoxy phenyl) N-(2-pyrrolidino ethyl) 4-butoxy phenoxy acetamide.

* * * * *